US008032744B2

(12) United States Patent
Doonan et al.

(10) Patent No.: US 8,032,744 B2
(45) Date of Patent: Oct. 4, 2011

(54) METHOD AND APPARATUS FOR SELF-AUTHENTICATING DIGITAL RECORDS

(75) Inventors: Wesley Doonan, Fairfax, VA (US); Albert J. Wettlaufer, Reston, VA (US); Rone H. Lewis, Bedminster, NJ (US)

(73) Assignee: Addison Fischer, Naples, FL (US)

( * ) Notice: Subject to any disclaimer, the term of this patent is extended or adjusted under 35 U.S.C. 154(b) by 1026 days.

(21) Appl. No.: 11/384,671

(22) Filed: Mar. 20, 2006

(65) Prior Publication Data

US 2006/0200661 A1    Sep. 7, 2006

Related U.S. Application Data

(63) Continuation of application No. 09/571,859, filed on May 16, 2000, now Pat. No. 7,047,404.

(51) Int. Cl.
| | |
|---|---|
| H04L 29/06 | (2006.01) |
| H04K 1/00 | (2006.01) |
| H04L 9/08 | (2006.01) |
| G06F 15/173 | (2006.01) |
| G06Q 40/00 | (2006.01) |
| H04N 1/32 | (2006.01) |
| G05B 19/00 | (2006.01) |
| G06F 7/58 | (2006.01) |
| G06K 19/06 | (2006.01) |

(52) U.S. Cl. ........ 713/156; 713/157; 713/158; 713/159; 713/176; 380/30; 380/286; 705/44; 709/226

(58) Field of Classification Search .................. 713/156, 713/157, 158, 159; 380/286, 30; 705/44; 709/226

See application file for complete search history.

(56) References Cited

U.S. PATENT DOCUMENTS

| | | | |
|---|---|---|---|
| 5,136,646 | A | 8/1992 | Haber et al. |
| 5,373,561 | A | 12/1994 | Haber et al. |
| 5,687,235 | A | 11/1997 | Perlman et al. |
| 5,745,574 | A | 4/1998 | Muftic |

(Continued)

FOREIGN PATENT DOCUMENTS

WO   WO 02091730 A1 * 11/2002

OTHER PUBLICATIONS

Karthikeyan Bhargavan, Cédric Fournet, Andrew D. Gordon, Nikhil Swamy; "Verified implementations of the information card federated identity-management protocol"; Mar. 2008; ASIACCS '08: Proceedings of the 2008 ACM symposium on Information, computer and communications security; Publisher: ACM; pp. 123-135.*

(Continued)

Primary Examiner — Eleni Shiferaw
Assistant Examiner — Courtney Fields
(74) Attorney, Agent, or Firm — The Marbury Law Group, PLLC

(57) ABSTRACT

A method for proving the validity of a digital document digitally signed using a digital key that corresponds to a digital certificate in a chain of digital certificates issued by certification authorities within a hierarchy of certification authorities. At least one secure digital time stamp is applied to at least one record comprising the digital document, the digital signature, certificate chain data, and information relating to the revocation of certificates by certification authorities within the certificate chain. If, at some later time, one or more digital certificates either expire or are revoked, the timestamp serves as evidence of the integrity of the signed digital document.

21 Claims, 7 Drawing Sheets

U.S. PATENT DOCUMENTS

| | | | | |
|---|---|---|---|---|
| 5,903,651 | A | | 5/1999 | Kocher |
| 5,903,882 | A | * | 5/1999 | Asay et al. ................... 705/44 |
| 6,442,689 | B1 | * | 8/2002 | Kocher ........................ 713/158 |
| 6,978,364 | B1 | * | 12/2005 | Balaz et al. ................... 713/153 |
| 2005/0114653 | A1 | * | 5/2005 | Sudia ........................... 713/158 |

OTHER PUBLICATIONS

Hans Nilsson, iD2 Technologies, Hans. Nilsson@iD2tech.com; "Validation of Electronic Signatures White Paper" pp. 1-10; Mar. 19, 1999; http://www.id2tech.com/news/pdf/ES_validation.pdf.

Laid-open Japanese Patent Publication No. Hei 11-119650.

R. Housley, W. Ford, W. Polk, D. Solo, "Internet X.509 Public Key Infrastructure Certificate and CRL Profile", Network Working Group Request for Comments: 2459, [online], Jan. 1999, Category: Standards Track, URL:http://www.rfc-editor.org/rfc/pdfrfc/rfc2459.txt.pdf.

M. Myers, R. Ankney, A. Malpani, S. Galperin, C. Adams, "X.509 Internet Public Key Infrastructure Online Certificate States Protocol—OCSP", Network Working Group Request for Comments: 2560, [online], Jun. 1999, Category: Standards Track, [retrieved on Mar. 23, 2011]. Retrieved from the Internet, URL, http://www.rfc-editor.org/rfc/pdfrfc/rfc2560.txt.pdf.

Laid-open Japanese Patent Publication No. Hei 11-289329.

C. Adams, S. Farrell, "Internet X.509 Public Key Infrastructure Certificate Management Protocols", Network Working Group Request for Comments: 2510, [online], Mar. 1999, Category: Standards Track, [retrieved on Mar. 23, 2011]. Retrieved from the Internet, URL, http://www.rfc-editor.org/rfc/pdfrfc/rfc2510.txt.pdf.

Naofumi Ishii, "Construction of a server in SuiteSpot 3.5, Chapter 5 Directory Server", Open Design, Japan, CQ Publishing Co., Ltd., Oct. 1, 1999, vol. 1, No. 5, pp. 72-91.

* cited by examiner

METHOD AND APPARATUS FOR SELF-AUTHENTICATING DIGITAL RECORDS

CROSS REFERENCE TO RELATED APPLICATIONS

This application is a continuation of U.S. patent application Ser. No. 09/571,859 filed May 16, 2000 now U.S. Pat. No. 7,047,404. The Ser. No. 09/571,859 application is incorporated by reference herein, in its entirety, for all purposes.

BACKGROUND

The present invention is directed to a process for ensuring the verifiability of a digitally signed electronic record.

Digital signatures can be formed using asymmetric key cryptography. Asymmetric key cryptography involves the use of certain mathematical constructs considered to be difficult to reverse, e.g. factorization of large integers or computing discrete logarithms of large integers. These mathematical constructs are used to generate a pair of cryptographic keys, with the property that data encrypted by one key can only be decrypted by the other key. One key is kept secret by the owner, and is referred to as the private key; the other key is published to the world, and is referred to as the public key.

Given the algorithmic nature of the mathematical constructs used to generate a given key pair, it is always possible to find the corresponding private key for a known public key given sufficient time and computing resources. To combat this problem each public key is assigned a finite period of time over which the key can be considered valid. This time period reflects an estimate of the amount of time required to determine the private key for a given public key, given the current state of the art in computing and cryptanalysis. Because it is always possible for the private key to be inadvertently compromised, there must also exist a means for notifying users of the corresponding public key that the key is no longer valid.

To facilitate the assignment of validity periods to public keys, and to support the notification of users when a public key becomes unexpectedly invalid, the concepts of digital certificates and certificate revocation lists (CRLS) have been introduced. Digital certificates are distributed by an issuer to their owners and are data structures which have a standardized format, such as that specified in the ITU X. 509 standard, among others. FIG. 1 shows a conceptual version of a digital certificate 100.

A digital certificate typically contains a serial number 102, information identifying the issuer of the certificate 104, information identifying the owner of the certificate 106, the owner's public key issued by the issuer 108 and information about the validity period 110 of the digital certificate. The digital certificate is digitally signed 112 with the issuer's private key.

Issuers of digital certificates are referred to as Certificate Authorities (CAs).

The CA accepts enrolment requests from users and produces the necessary certificates. In issuing a certificate, the CA attests to the correctness of the certificate it issues by signing each certificate with its own private key. The CA publishes its public key in a certificate as well, in order for users to be able to validate the certificates it issues.

The CA also provides the means for notifying users when the certificates it issues become invalid (i.e., when the user to whom the certificate was issued loses control of the corresponding private key because it was stolen or otherwise compromised.) When a CA is informed that a certificate can no longer be trusted for some reason, the CA revokes the certificate by placing it on a Certificate Revocation List (CRL), which is another standardized data structure specified, for example, by the aforementioned X. 509 standard. As conceptually illustrated in FIG. 2, a CRL 120 contains the serial number 122 of each revoked certificate and the date and time 124 at which the CRL was issued. The CRL is also signed by the issuing CA using its digital signature 126, and published in accordance with that CA's security policy, which may call for periodic updates, updates upon request and updates upon the occurrence of predefined events, among others.

Often a CA is a member of a hierarchy of CAs, with higher-level CAs attesting to the validity of lower-level CAs. When a CA is part of a hierarchy of CAs, the certificate issued to a lower-level CA is signed by a CA higher in the hierarchy.

Since at the highest level of the CA hierarchy there is no higher-level CA available to sign that CAs certificate, the highest-level CA signs its own certificate. The validity of these self-signed certificates is determined through some out-of-band means.

FIG. 3 illustrates a sample hierarchy 200 of certification authorities having a total OF N=4 levels of certification authorities with end users being found at more than one level. The highest, or first level certification authority is designated the "ROOT" LEVEL and indicated by CA-Root 202. As seen in the hierarchy of FIG. 3, the root CA 202 signs its own root certificate CA-Root 203, puts out a root certificate revocation list CRL-Root 204 in accordance with its security policy, and issues digital certificates DC-1 206 and DC-2, to second level (level-2) certification authorities CA-1 210 and CA-2 212, respectively. The level-2 certification authorities CA-1 and CA-2 put their own certificate revocation lists CRL-1 214 and CRL-2 216, respectively.

CA-1 210 also issues digital certificate DC-11 218 to USER-1 220, while CA-2 212 issues digital certificate DC-3 222 to level-3 certification authority CA-3 224. CA-3 puts out CRL-3 226 in accordance with its security policy and also issues digital certificate DC-32 228 to USER-2 230. As seen with CA-1, it is possible for a certification authority to issue digital certificates to both users and to other certification authorities.

The structure of the hierarchy below CA-2 212 should now be clear from the foregoing description of the corresponding structure below CA-1 210. It is noted, however, that two certification authorities can issue different digital certificates to a single user, as seen with the level-4 certification authorities CA-6 232 and CA-7 234, which issue DC-65 236 and DC-75 238 to USER-5 240. Similarly, two certification authorities can issue unique digital certificates to the same certification authority. In such instances where two such digital certificates are received, the owner must keep track of which certificate to use at any given time.

As seen in FIG. 3, USER-1 220 is issued digital certificate DC-11 FROM the 2ND level certification authority CA-1, and USER-2 is issued digital certificate DC-32 from the 3TD level certification authority CA-3. DC-1 and DC-3 belong to the same certificate chain—the chain comprising DC-3, DC-1 and DC-Root. Within this chain, digital certificate DC-11 belongs to a certificate chain comprising only DC-1 and DC-Root, while digital certificate DC-32 belongs to a certificate chain comprising all three of DC-3, DC-1 and DC-Root. As also seen in FIG. 3, DC-2 belongs to a number of certificate chains, such as the chain comprising DC-6 issued to CA-6 232, DC-4 issued to CA-4, DC-2 issued to CA-2 212 and DC-Root, and the chain comprising DC-7 issued to CA-7 234, DC-5 issued to CA-5, DC-2 and DC-Root.

It should be understood that the hierarchy of the various entities (i.e., certification authorities and users) may be independent of the physical location of the entities, the type of communication links (wireless, wireline, optic, etc.) between the entities, the types of devices (computers, hand-held communication devices, set-top boxes, etc.) and the roles played by the various CAs and users (supplier, consumer, broker, internet service provider, etc.).

Thus, as shown in FIG. 4, the various entities may belong to a common organization, housed at a single site or even a single building 250 and connected via a LAN 252 It is understood that such a LAN may also have storage devices 254, communication devices 256, output devices 258, among others, associated therewith.

In such case, a central administrative authority can keep track of all the digital certificates and CRLs, perhaps storing them in a database not accessible by all the entities on the LAN. It should be kept in mind that each entity is not necessarily a distinct computing platform but rather is a process running on that platform. Thus, in the embodiment of FIG. 4, it is entirely possible that all of the CAs and 'users' are all implemented as processes running on a single computer, albeit with different trust boundaries amongst the entities and different access privileges accorded to each.

Alternatively, as shown in FIG. 5, the various entities of FIG. 3 may be distributed among various organizations and connected via the internet in any number of different ways. Thus, USER-2, CA-Root, CA-1 and CA-2 are directly connected to the internet, CA-1 also being an internet service provider ISP-1 300. The remaining entities are connected either by internet service providers ISP-2 302 or ISP-3 304 or via a gateway computer 306 to which a LAN or WAN 308 is connected.

It should be noted that the various entities may be connected to one another in any number of ways between the extremes shown in FIGS. 4 and 5. What is important is that a hierarchical system of CAs does not dictate either the location, ownership or role (apart from security) of the various entities.

Once a certificate has been issued to an end user, it can be used to sign digital records which, in this context, includes any and all forms of electronic documents, transactions, files, etc. A record is signed by encrypting some representation of the record with the user's private key. The signature can later be validated by decrypting the representation using the public key contained in the user's certificate and comparing it to the record. However, validating a signature also requires that the certificate containing the public key be verified as well. Checking the encrypted record representation can only verify whether the record matches the signature value; the status of the key used to form the encryption must also be verified.

Checking the validity of a certificate involves a number of steps. The validity period of the certificate must be checked against the current time, to be sure the key contained in the certificate has not expired. The signature applied to the certificate by the issuing CA must be validated, to ensure the certificate contents have not been tampered with. The current CRL for the issuing CA must be checked to determine if the certificate has been revoked. Because the CRL is itself a signed data item, the signature on the CRL must also be checked for validity. Finally, the certificates of the issuing CA and all higher-level CAs must be checked for validity, until the root self-signed certificate is reached. CA certificates are checked in the same manner as the actual end user certificate, by examining validity periods and CRLs for the corresponding higher-level CAs.

Once any element of the digital signature process is no longer valid, any signature based on that element can no longer be considered valid. For example, if the public key in a CA's certificate reaches the end of its validity period, all certificates issued by that CA with that certificate can no longer be validated. Hence, any signatures formed using those certificates can also no longer be validated. Since digital certificates only have a finite period of validity, typically on the order of one year, expiry is a concern. Likewise, if a CA's certificate is ever revoked, all certificates issued by the CA using that certificate are no longer valid, and hence signatures formed using them cannot be successfully validated.

The use of digital signature technologies has begun to permeate almost every sector of society as paper-based functions are moved into electronic form. Digital signatures provide both the capability to identify the signer of an electronic record, and provide the means for protecting the record against tampering. The combination of these two capabilities allows digital signatures to essentially replace paper records and hand-written signatures.

While digital signatures can be used to replace the identity and integrity functions of hand-written signatures and paper records, there are other important characteristics of paper records that digital signatures by themselves cannot replicate. Principal among these characteristics is the inherent stability of hand-signed paper records, as compared to digitally signed electronic records. That is, a hand-signed paper record remains valid as long as the physical instance of that record exists.

Given proper physical safeguards, a paper record can remain valid for extended periods of time.

The validity of digitally signed electronic records, however, is subject to the limitations of the cryptographic primitives in use. For instance, as advances in computing technology provide greater computing power for lower cost, it becomes increasingly easy to dispute the validity of a digital signature based on the computational feasibility of reversing some mathematical construct. Likewise, as advances in cryptanalysis enable new attacks on various encryption algorithms, signatures based on those encryption algorithms will increasingly come under attack.

Thus, to truly duplicate the features and characteristics of hand-signed paper records in the digital age, some means for ensuring the perpetual validity of digital signatures is required.

SUMMARY

The present invention is directed to a method for producing digital records whose digital signatures are impervious to advances in both available computing power and cryptanalysis, thus allowing those signatures to remain verifiable for long periods of time. More particularly, the invention employs a process for creating a self-validating, signed digital record, such that expiry or revocation of any of the elements required for successful validation of the original signature does not invalidate the signature itself. The effect is that one can thus prove that, at any time in the future, the signature and the record contents were genuine at the time of signing.

Furthermore, this will remain true at any point in time despite the status of the original signing certificate.

In one aspect, the invention applies a secure timestamp to a compound document. The compound document comprises at least one record digitally signed by a user, the digital certificates of the user and the issuer, and corresponding certificate revocation information. Thus, the timestamp is applied to the information required to prove the validity of the digital signature, and to the record to which the signature has been applied.

In another aspect, the compound document that is timestamped includes the digital certificate of the user and the digital certificates of all certification authorities in the certification chain, including the root certification authority. The effect is that one can thus prove that, at any time in the future, the signature and the record contents were genuine at the time of signing. Furthermore, this will remain true at any point in time despite the status of the original signing certificate.

In yet another aspect, the invention applies a first timestamp to a number of records which were signed during a finite time period, and a second timestamp to the digital certificates and certificate revocation information, so as to avoid redundantly transmitting the latter.

In yet another aspect, the certificate revocation information is in the form of certificate revocation lists or CRLDPs provided by the various certification authorities. In another aspect, the certificate revocation information is obtained from certificate revocation list distribution points or from verification authorities (VAs) using the OSCP protocol.

In yet another aspect of the invention, the digital certificates are realized by an ITU X. 509 or an SPKI certificate.

DESCRIPTION OF THE DRAWINGS

The present invention can better be understood through the attached figures in which.

DETAILED DESCRIPTION

The present invention contemplates that at least one secure digital timestamp is applied to a digitally signed document and to validation information which attests to the validity of the digital signature applied to the digitally signed document. The validation information includes the digital certificates issued by certification authorities in a hierarchical chain, including the digital certificate used to sign the document, along with certificate revocation information provided by the respective certification authorities, when present. Thus, in the case where the root certification authority is the entity that digitally signs the document, the validation information only comprises the root certification authority's self-signed certificate, there being no meaningful certificate revocation information.

In a preferred mode, all the digital certificates issued in a hierarchical chain, up to and including the root authority, are included in the validation information for which a timestamp is requested. However, it may sometimes be sufficient for the user to include only a partial certificate chain and corresponding certificate revocation information. In this case, the user would include a first digital certificate issued to the user by a first certification authority, a second digital certificate which was used by the first certification authority to issue the first digital certificate to the user. The user would also include certificate revocation information from the first certification authority and the second certification authority which issued the second digital certificate to the first certification authority.

Figure 1:
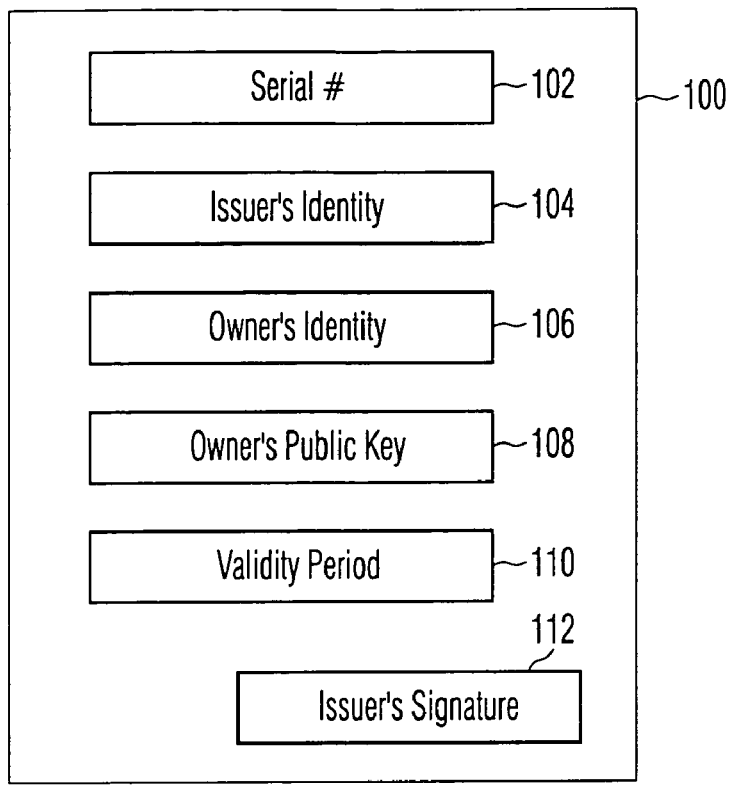
FIG. 1 illustrates the content of a digital certificate.
Figure 2:
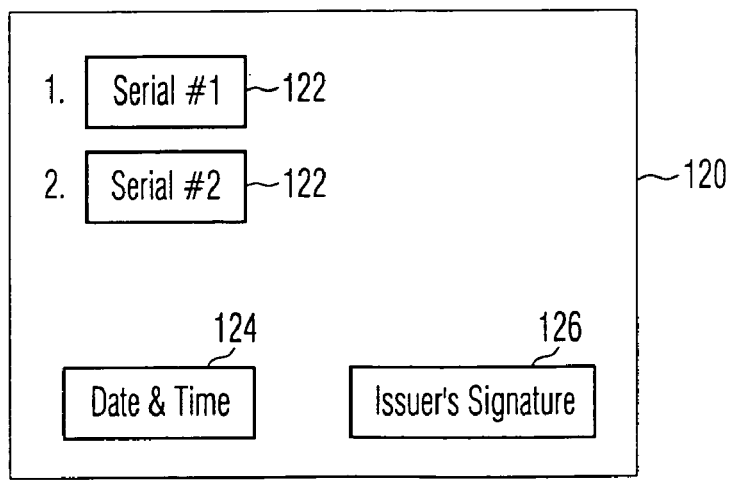
FIG. 2 illustrates the content of a certificate revocation list.
Figure 3:
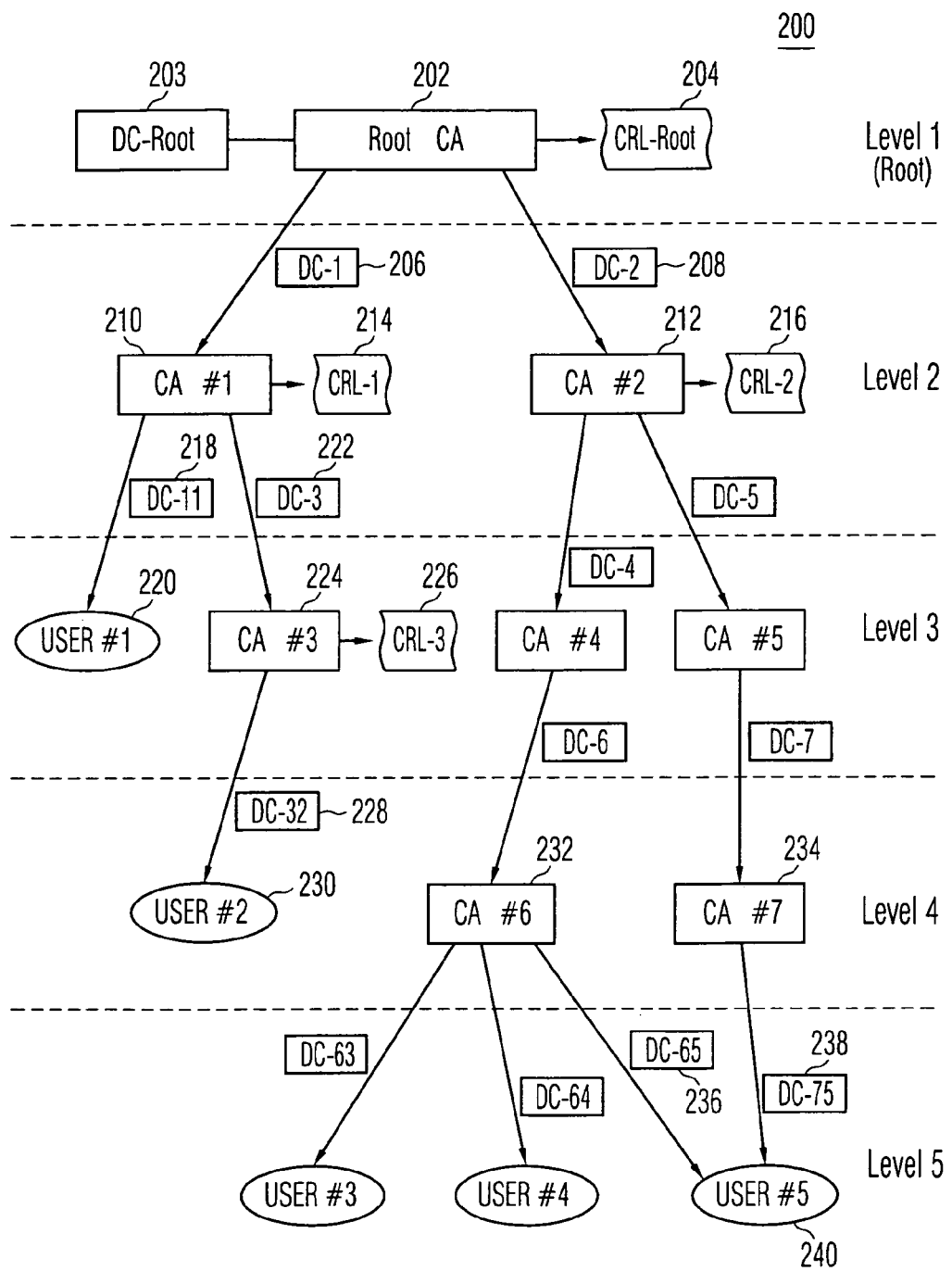
FIG. 3 illustrates a hierarchy of certification authorities and users.
Figure 4:
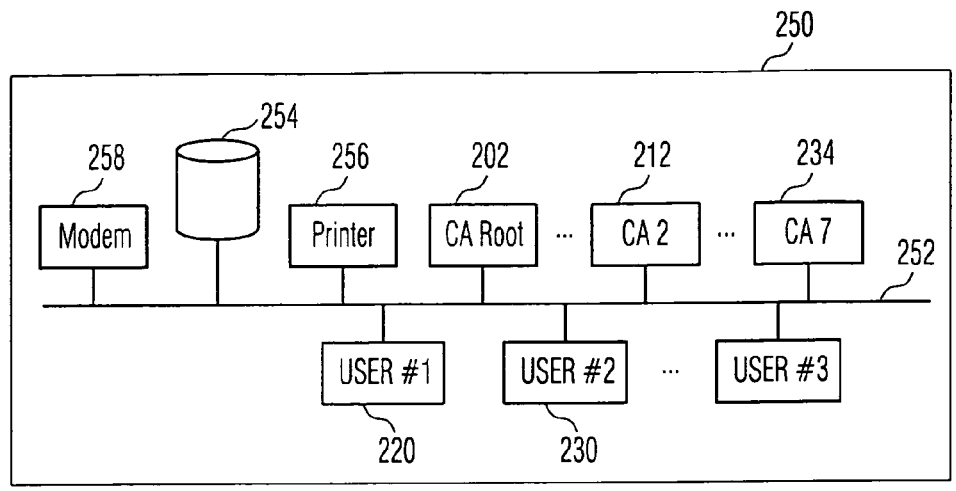
FIG. 4 illustrates one arrangement for the entities in the hierarchy of FIG. 3.
Figure 5:
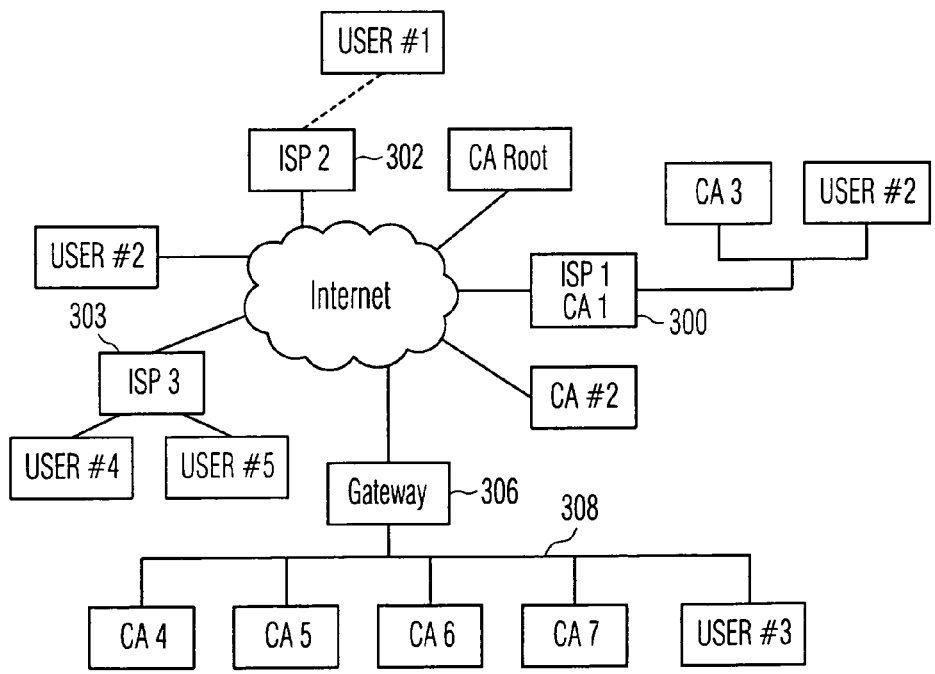
FIG. 5 illustrates another arrangement for the entities in the hierarchy of FIG. 3.
Figure 6:
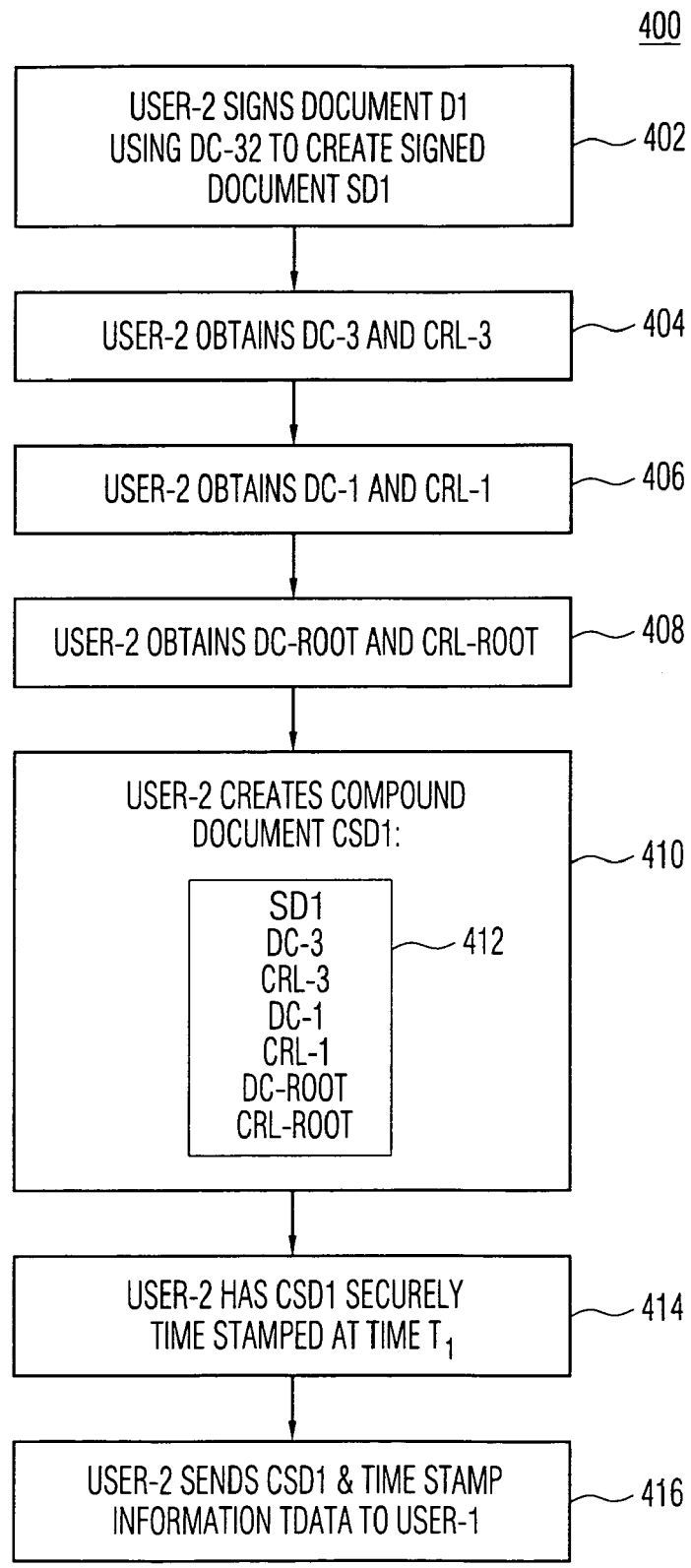
FIG. 6 illustrates a method for a sender to validate a record in accordance with a first embodiment of the present invention.

The present invention can be described by an example which uses the hierarchical structure of FIG. 3. In this example, it is assumed that the various certification authorities and users listed in FIG. 3 exist, the various digital certificates have been issued and the certificate revocation lists are available, in accordance with each CA's security policy. FIG. 6 shows a flow chart 400 of the steps carried out in a preferred embodiment of the present invention, using the hierarchical structure of FIG. 3.

For these purposes it is assumed that USER-2 is to sign and send a record to USER-1.

As seen in FIG. 3, USER-2 receives a digital certificate DC-32 from level 3 certification authority CA-3 224, which is at the end of a chain comprising CA-3 224, CA-1 210 and CA-Root 200. In step 402 USER-2 signs a record D1 using digital signature DC-32. This creates signed record SDI.

In step 404 USER-2 obtains DC-3 and CRL-3, since these are associated with CA-3, the entity which provided DC-32 to USER-2. USER-2 checks CA-3 and recognizes that is not the root, so it needs further information.

Next, in step 406, USER-2 obtains DC-1 and CRL-1, since these are associated with CA-1, the entity which provided DC-3 to CA-3 (and so is the next CA is the USER-2's chain of certification authorities within the hierarchy. USER-2 checks CA-1 and recognizes that is not the root, so it again needs further information.

In step 408, USER-2 obtains DC-ROOT and CRL-ROOT, since these are associated with CA-ROOT, the entity which provided DC-1 to CA-1 and is at the top of the hierarchy. USER-2 checks CA-ROOT and therefore understands that no higher level information is required, since DC-Root is self-signed. Thus, USER-2 obtains its certificate chain which comprises the digital certificates issued to all certification authorities between the level of its issuing certification authority, and the root certification authority, inclusive. USER-2 also obtains the certificate revocation information corresponding to its certificate chain.

In steps 404, 406 and 408, USER-2 generally must take some initiative to obtain the various digital certificates and CRLs. This can be done in a number of ways, known to those skilled in the art. In general, a user obtains a certificate using the certificate request methodology implemented by the corresponding CA. For example, a CA may choose to publish certificates and CRLs in an online directory, to which the user may make requests. This can be done, for example, by using X. 500 or LDAP protocols. Alternatively, the CA may provide online access to certificates and CRLs through the CMP ("Certification Management Protocols"), as defined in IETF RFC 2510 and 2511. Finally, a CA may choose to provide access to certificate and CRL data through a store-and-forward email system, such as Internet MIME-mail.

In step 410, USER-2 creates a compound document CSD1 412. Compound document CSD1 includes the signed record SD1, the three digital certificates, and the corresponding certificate revocation lists in the chain within the hierarchy to which USER-2 belongs. The compound document CSD1 can be realized in various forms, including simple directories of individual files, compressed archives of files, Multipart MIME encoded file, actual compound document types in the form of a portable document format, such as the well-known Adobe PDF, among others.

At step 414, USER-2 makes a request to have the compound document CSD1 securely timestamped. This associates a fixed time TL with the creation of the compound document CSD 1. The timestamp can be applied in any number of different ways known to those skilled in the art. What is crucial is that USER-2 should not be able to falsify the time associated with that timestamp. And for this, the user requests that at least one secure digital timestamp be applied to the digitally signed first document and also to validation information which attests to the validity of the digital signature.

The timestamping approaches disclosed in U.S. Pat. No. RE 34,954, whose contents are incorporate by reference, may be used for this purpose. In a preferred embodiment, a secure timestamping facility, perhaps operated by an outside agency or trusted third party, is used to attach a cryptographically-secure timestamp to the compound document. A secure timestamp is one which provides proof that a specific piece of digital data existed at a specific moment in time. In a preferred embodiment, the timestamp is computed over the entire compound document, including the original content, the digital certificates and CRL data. This produces timestamp information TDATA, which can be used to prove that the compound document CSD1 existed at time TL.

The cryptographically-secure timestamp value provides proof that the computed signature existed at a specific moment in time; it also provides proof that the certificates used to form the signature were valid at that same moment in time. If in the future any of the certificates contained in the compound document expire or are revoked, the record signature is unaffected, as the timestamp provides proof that at the time the signature was created all certificates were valid.

Finally, in step 416, USER-2 sends the compound document CSD1 along with timestamp information to USER-1.

From the foregoing description of FIG. 6, the general process should be evident. A user obtains the certificate and corresponding CRL for each certificate involved in the validation process. That is, the certificate and CRL for the CA that issued the user's certificate are obtained; likewise, if the CA's certificate was issued by a higher-level CA, the certificate and CRL for that higher-level CA are also obtained.

It should be noted, however, that if the CRL information is signed with a different key from that used to issue certificates, the certificate and CRL information for that key are also obtained. This process continues until a self-signed root certificate is reached.

The user then validates each certificate and CRL, checking that both the validity periods are correct for the current time, and the required certificates are not listed on the relevant CRLs. This process then proves the certificate is valid at the current time. The user then creates a compound document, containing the signed record, the signature information for that record, and a copy of all the certificates and CRLs required to validate the signature and certificates up to a self-signed root certificate, and includes a copy of the root certificate. The timestamp can be applied to the entire compound document, or separate timestamps may be applied to the signed record (to prove when it record was created) and to the certificate and CRL information.

Figure 7:
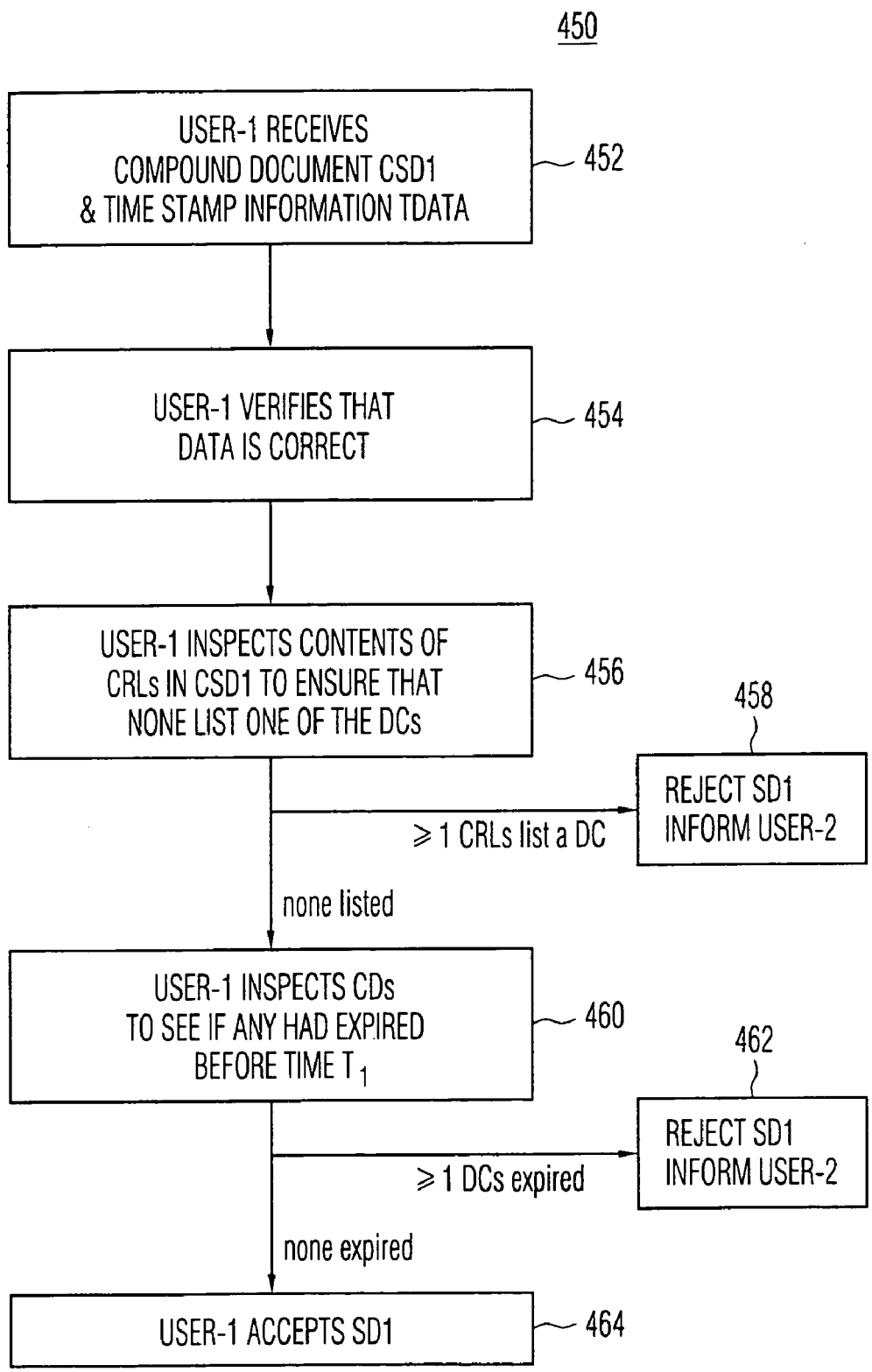
FIG. 7 illustrates a method of recipient to authenticate a record, in accordance with the present invention.

FIG. 7 shows a flowchart 450 illustrating a preferred embodiment of the steps taken by USER-1 to process the information received from USER-2. In step 452, USER-1 receives the compound document, along with the timestamp information TDATA. USER-1 can validate the received information using USER-2's public key and the public keys of the various certification authorities.

In step 454, USER-1 verifies that the timestamping data, TDATA, is correct and corresponds to the received compound document.

In step 456, USER-1 inspects the contents of the CRLs and confirms that none of the digital certificates were revoked at the time of the timestamping TL. This assures USER-1 that the digital certificates DC-1, DC-3 and DC-32 were not compromised as of the time the compound document was timestamped. If any of the CRLs contains one of the digital certificates, the control proceeds to step 458 where USER-1 rejects the signed record SD1 and informs USER-2 of this. It should be noted, that USER-1 may inform other entities, as well, that USER-2 sent unacceptable information.

If USER-1 finds that none of the CRLs list one of the received digital certificates, then control proceeds to step 460. In step 460, USER-1 inspects the digital certificates to see if any had expired before timestamping time T1 and also validates the signatures on the digitally signed document and on each of the certificates. If so, then control proceeds to step 462 where USER-1 rejects the signed record SDI and informs USER-2 of this. Again, USER-1 may INFONN other entities that USER-2 relied on an expired digital signature, belonging to either USER-2, or to a certification authority in USER-2's chain. It should be noted here that the order of steps 454, 456 and 460 may be permuted, the critical thing being that USER-1 is satisfied that the compound document CSD1 has neither been compromised, nor signed using an expired digital certificate.

In step 464, assuming that USER-1 is satisfied that the information received from USER-1 is completely valid, USER-2 accepts the signed record SD1.

Figure 8:
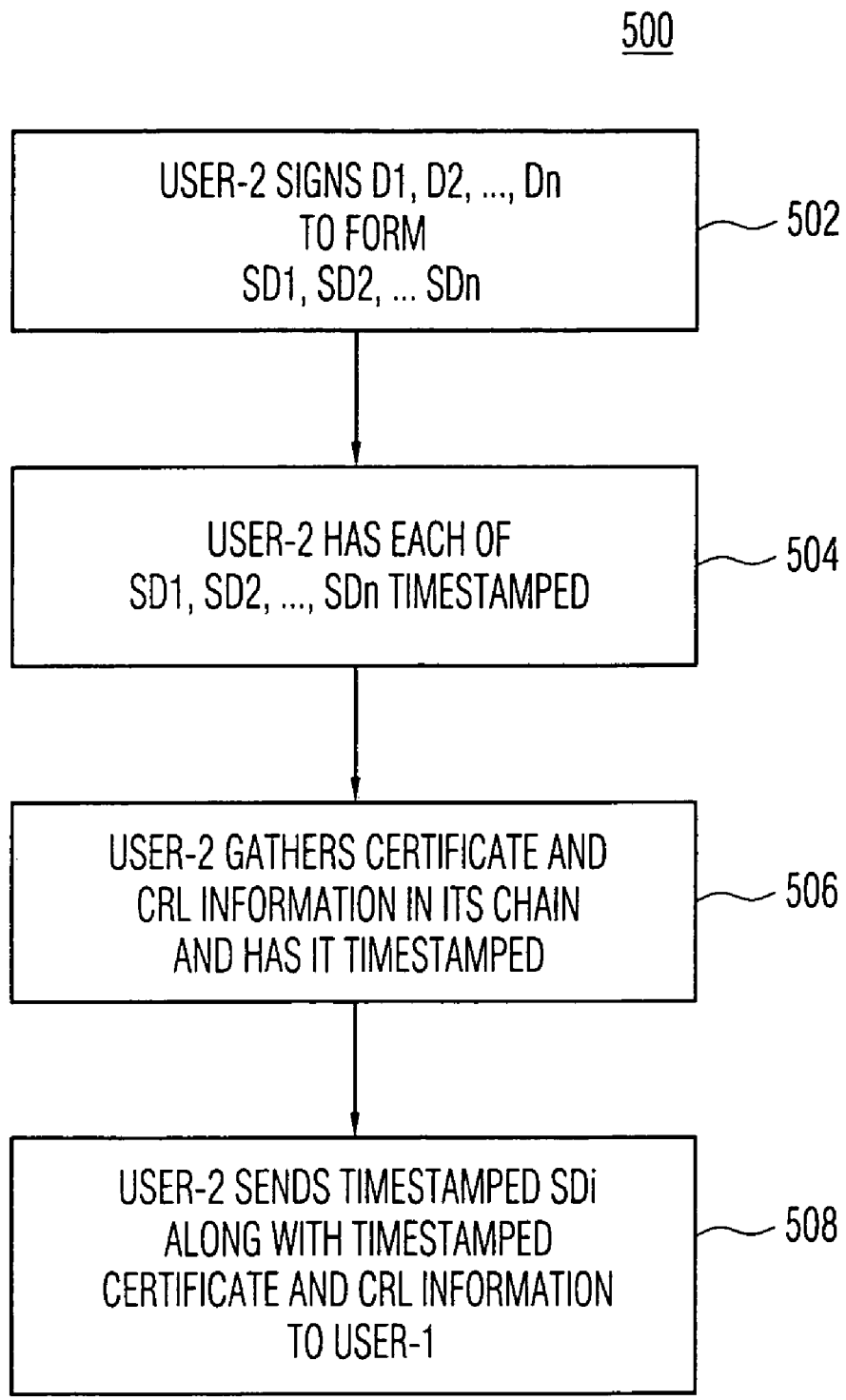
FIG. 8 illustrates a method for a sender to validate a record in accordance with a second embodiment of the present invention.

FIG. 8 shows a flowchart 500 of a second preferred embodiment of the present invention, in which several records, D1, D2, D3, . . . Dn are to be signed and sent by USER-2 to USER-1. In step 502, USER-2 signs each of the records to create SD1, SD2, . . . , SDn. The records may be digitally signed as each is created. In step 504, each of these signed records is securely timestamped, preferably soon after signing, to establish a time not later than when each signature was created. In step 506, at some later predetermined time, and perhaps periodically, USER-2 gathers the relevant certificate and CRL information, preferably into a single file. The gathered material is then timestamped using the same timestamping service. In step 508, USER-2 sends USER-1 the signed and timestamped records, together with the gathered and timestamped certificate and CRL information. From USER-1's perspective, all those records signed and timestamped before the combined CRL and certificate data were timestamped are provably valid, as the timestamp attests to the fact that the record signatures existed before the certificate and CRL information. Thus, in this second preferred embodiment, the certificate and CRL information are separated from the actual signed record content. This prevents duplication of the same certificate and CRL data for each of several records.

Because the various records may be created sequentially, the timestamping applied to the records in this embodiment may make use of the "linking" technique disclosed in aforementioned U.S. Pat. No. RE 34,954, which calls for a causational relationship between timestamps issued by the timestamping service. In such case, several users, each requesting timestamps from the same timestamping service, may be accommodated by a single timestamping process. It should be noted, however, that the concept of FIG. 8 can be used to authenticate just a single document, in which case a first time stamp is applied at time TL to a single signed document and later on, the validation information for D 1 is gathered and a second timestamp is applied at time T2.

Figure 9:
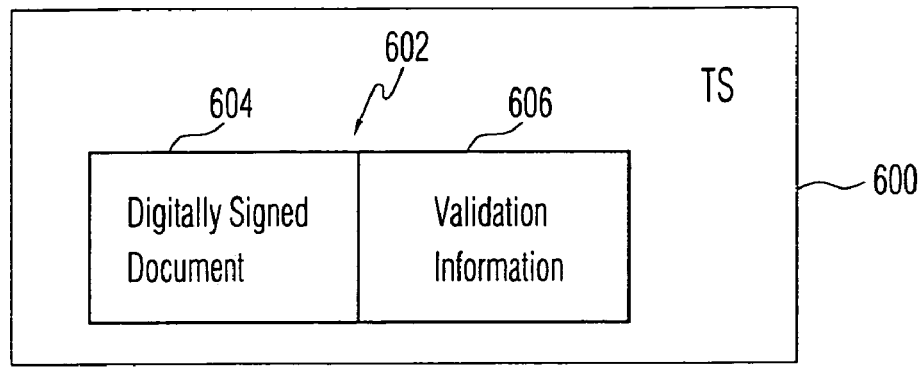
FIG. 9 illustrates the resulting data structure from the first embodiment of the present invention.
Figure 10A:
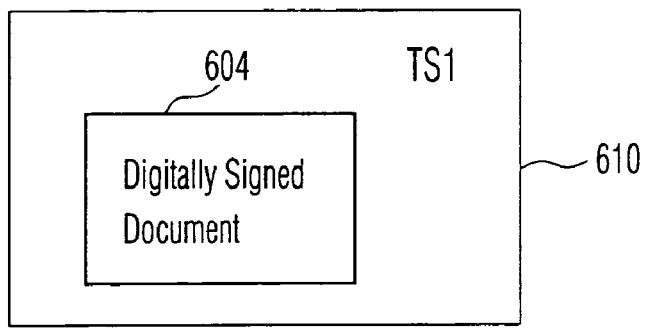
FIGS. 10A and 10B illustrate the resulting data structures from the second embodiment of the present invention.
Figure 10B:
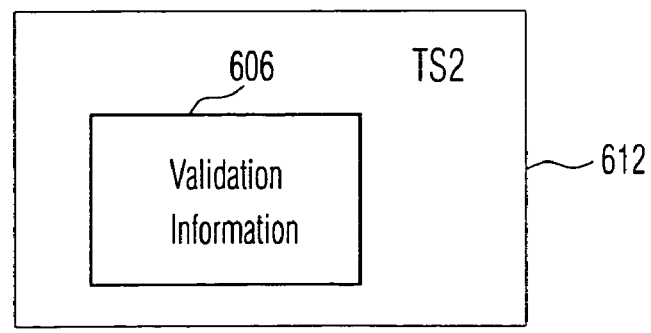

FIG. 9 conceptually illustrates the result from using the first embodiment of the present invention. The first embodiment results in a single object 600 which represents a second document 602 timestamped at some time Ts, the second document itself comprising the digitally signed first document 604 and the validation information 606. FIGS. 10A & 10B conceptually illustrate the result from using the second embodiment of the present invention. In contrast to the first embodiment, the second embodiment results a pair of objects 610,612. The first object 610 represents the digitally signed first document 604 timestamped at some time TUS1, while the second object represents the validation information 606 timestamped at some later time TS2. IT should be noted here that while FIGS. 10a & 10b depict only a single 'first document', in the case of FIG. 8, many such "first objects", each representing signed documents timestamped at various times, and a single "second object" would be created.

In the above two preferred embodiments, the certificate revocation information is in the form of CRLs issued by the various CAs. As is known to those skilled in art, over time, CRLs become large because they include information about all digital certificates which have been ever been revoked, from the time that the issuing certification authority was created, whether or not they are pertinent to the chain of interest.

An alternative to using the complete CRLs promulgated by the issuing CAs, is to refer to subsets of an entire CRL, by asking for only certain classes or set of CRLs.

For example, one may request a subset which contains only updated, or recent, information, e.g, information about digital certificates which had been revoked during an immediately preceding time period. This "recent" information may be obtained from one or more types of sources. As another example, one may request comprising the CRLs for a particular branch of a hierarchical tree, or a domain.

One such source for a subset of an entire CRL is a CRL distribution point, or CRLDP, as described in ETF RFC 2459. As is known to those skilled in the art, a CRLDP is a location where a particular subset can be found. Thus, instead of asking the CA for the CRL, the user looks in the digital certificate for a "CRL distribution point" extension. If the certificate contains the extension, the value of the extension is a URI (which is similar to the well-known URL—Uniform Resource Locator) which points to where the CRLDP can be found. CAs use CRLDPs to point to different classes/sets of certificates at different places for their CRL information, thus allowing the CA to partition the monolithic CRL document into a bunch of smaller CRL documents, one for each class/set of certificates. The certificate CLASSES/SETS themselves are determined by the CA's policy.

Another alternative to using CRLs, is to use signed certificate status reports obtained through an on-line OCSP responder protocol, as described in IETF RFC 2560. In this realization, the revocation status of each certificate is attested to by a Validation Authority (VA) which operates an on-line OCSP responder. As is known to those skilled in the art, OCSP responders may be associated with the CA-ROOT, or other entity, as dictated by the policy of the organization operating the hierarchy. The platform on which the OSCP responder resides, and its configuration within a network are left to the operators of the VA. To use an OCSP responder, a user sends a request asking for the current revocation status of a particular certificate. The OCSP responder returns a signed response indicating whether or not the requested certificate has been revoked by the issuing CA. The OCSP responder determines this information through some form of interaction with the issuing CA, according to the security policy of the CA and the operational implementation of the CA process. The signed response from the OCSP responder is a data structure containing status information for a particular certificate. These data structures are requested and returned through use of the OCSP protocol. Because OCSP responses are signed data items, the certificates used by the various VAs to sign those responses must also be included in the compound document. In addition, all the certificates and certificate status information required to validate each VA certificate is also included in the compound document, before it is timestamped. The benefit of using signed OCSP responses, however, is that they are typically much smaller than the corresponding complete CRLs, thus saving bandwidth and storage.

The present invention is preferably implemented through a combination of one or more computing platforms, such as general or special purpose computers, and executable software code running on these. The computing platform is typically provided with hardware and/or ports to interface to at least one computer readable medium, such as a PROM, flash memory, CD-ROM, optical disk, hard drive disk, floppy disk or other non-volatile memory to store firmware and executable software code. The executable software code running on the various platforms may be downloaded from some computer readable medium via the interne or other communication channel. The computer will usually also have a second computer readable medium, such as associated RAM or other volatile memory to provide workspace for data and additional software.

The configuration of the hierarchy will determine which portions of the executable software code run on which computing platforms. Thus, for example, a client computer which has received the user's digital certificate preferably has the executable software code for signing the document that is being authenticated, and the executable software code for requesting that a time stamp be applied to the signed document and any validation information. Such a client computer may also have code for obtaining the various digital certificates and certification information, along with the code to form the appropriate data structures for which a secure digital timestamp is requested.

A method and apparatus for self-authenticating digital records has been disclosed. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A method for generating a self-authenticating digital document comprising:
   receiving or generating a digital document at a computing device;

generating a digital signature using the computing device, wherein the digital signature is generated from signature data and wherein the signature data comprises the digital document;

receiving at the computing device certificate chain data, where certificate chain data is a subset of a chain of m+1 digital certificates issued by m certification authorities, wherein m≧1, wherein the chain comprises a self-signed $1^{st}$ (root) level certificate, k intermediate level certificates, and an $(m+1)^{th}$-level certificate that corresponds to the digital key used to generate the digital signature, and wherein for $1<j\leq m+1$, a $j^{th}$ level certificate is signed by a digital certificate key corresponding to the $(j-1)^{th}$ certificate in the chain;

receiving at the computing device certificate revocation information corresponding to the m certification authorities wherein the certificate revocation information identifies digital certificates that have been revoked by the m certification authorities; and generating digital timestamp data using the computing device, wherein the digital timestamp data is generated by applying at least one secure digital timestamp to a record comprising the digital document, the digital signature, the chain data, and the revocation information, and wherein the at least one secure digital timestamp comprises a digital representation of the record cryptographically bound to a digital representation of a current time.

2. The method of claim 1, wherein the signature data further comprises at least one of the certificate chain data and the certificate revocation information.

3. The method of claim 1, wherein applying at least one secure digital timestamp to a record comprises applying a first secure digital timestamp to a first record using a computing device, wherein the first record comprises the digital document and the digital signature, and applying a second digital timestamp to a second record, wherein the second record comprises the chain data and the revocation information.

4. The method of claim 1, wherein the record is formatted as one in a group consisting of a compressed archive, a portable document format file, and a multipart encoded file.

5. The method of claim 3 wherein the second record is formatted as one in a group consisting of a compressed archive, a portable document format file, and a multipart encoded file.

6. The method of claim 1, wherein the certificate revocation information includes at least one certificate revocation list identifying digital certificates revoked by one of the m certification authorities.

7. The method of claim 6, wherein the certificate revocation list comprises a CRLDP.

8. The method of claim 1, wherein the certificate revocation information includes at least one OCSP response for one of the m+1 digital certificates.

9. The method of claim 1, wherein at least one digital certificate, corresponding to one of the m certification authorities, is obtained pursuant to at least one of an X. 500 directory query, an LDAP query, a certification management protocol query, and an electronic mail transfer.

10. The method of claim 1, wherein chain data comprises all m+1 certificates in the certificate chain.

11. A method of verifying a self-authenticating digital document at a point in time comprising:

receiving a self-authenticating digital document at a device, wherein the self-authenticating digital document comprises:
  a digital document;
  a digital signature, wherein the digital signature was generated from signature data, wherein the signature data comprises the digital document;
  chain data, where chain data is a subset of a chain of m digital certificates issued by m+1 certification authorities, wherein m≧1, wherein the chain comprises a self-signed $1^{st}$ (root) level certificate, k intermediate level certificates, and an $(m+1)^{th}$-level certificate that corresponds to the digital key used to generate the digital signature, and wherein for $1<j\leq m+1$, a $j^{th}$ level certificate is signed by the digital certificate key corresponding to a $(j-1)^{th}$ certificate in the chain; and
  certificate revocation information corresponding to the m certification authorities wherein the certificate revocation information identifies digital certificates that have been revoked by the m certification authorities; and
  digital timestamp data, wherein timestamp data is generated by applying at least one secure digital timestamp to a record comprising the document, the digital signature, the chain data, and the revocation information and wherein the at least one secure digital time stamp comprises a digital representation of the record cryptographically bound to a digital representation of a current time;
validating by the device the digital signature;
validating by the device the certificate chain data;
validating by the device that at the time the digital signature was generated, a digital certificate in the chain data had not expired or been revoked; and
validating by the device the timestamp data.

12. The method of claim 11, wherein the signature data further comprises at least one of the certificate chain data and the certificate revocation information.

13. The method document of claim 11, wherein applying at least one secure digital timestamp to a record comprises applying a first secure digital timestamp to a first record, wherein the first record comprises the digital document and the digital signature, and applying a second digital timestamp to a second record, wherein the second record comprises the chain data, and the revocation information.

14. The method of claim 11, wherein the record is formatted as one in a group consisting of a compressed archive, a portable document format file, and a multipart encoded file.

15. The method of claim 13 wherein the second record is formatted as one in a group consisting of a compressed archive, a portable document format file, and a multipart encoded file.

16. The method of claim 11, wherein the certificate revocation information includes at least one certificate revocation list identifying digital certificates revoked by one of the m certification authorities.

17. The method of claim 16, wherein the certificate revocation list comprises a CRLDP.

18. The method of claim 11, wherein the certificate revocation information includes at least one OCSP response for one of the m+1 digital certificates.

19. The method of claim 11, wherein at least one digital certificate, corresponding to one of the m certification authorities, is obtained pursuant to at least one of an X. 500 directory query, an LDAP query, a certification management protocol query, and an electronic mail transfer.

20. The method of claim 11, wherein the chain data comprises all m+1 certificates in the certificate chain.

21. A method for generating a self-authenticating digital document for distribution to others comprising:

receiving or generating at a first computing device a digital document and a digital signature, wherein the digital signature is generated from signature data and wherein the signature data comprises the digital document;

receiving at the first computing device certificate chain data, where certificate chain data is a subset of a chain of m+1 digital certificates issued by m certification authorities, wherein $m \geq 1$, wherein the chain comprises a self-signed $1^{st}$ (root) level certificate, k intermediate level certificates, and an $(m+1)^{th}$-level certificate that corresponds to the digital key used to generate the digital signature, and wherein for $1 < j \leq m+1$, a $j^{th}$ level certificate is signed by a digital certificate key corresponding to the $(j-1)^{th}$ certificate in the chain;

receiving at the first computing device certificate revocation information corresponding to the m certification authorities wherein the certificate revocation information identifies digital certificates that have been revoked by the m certification authorities;

generating digital timestamp data using the first -computing device, wherein the digital timestamp data is generated by applying at least one secure digital timestamp to a record comprising the digital document, the digital signature, the chain data, and the revocation information, and wherein the at least one secure digital timestamp comprises a digital representation of the record cryptographically bound to a digital representation of a current time; and distributing the record and the digital timestamp to a second computing device for verification.

* * * * *